(12) United States Patent
Dawson et al.

(10) Patent No.: US 10,576,728 B2
(45) Date of Patent: Mar. 3, 2020

(54) PRINTING MULTICOLORED THREE-DIMENSIONAL PRODUCTS

(71) Applicant: International Business Machines Corporation, Armonk, NY (US)

(72) Inventors: Alan B. Dawson, Hampshire (GB); James P. Hodgson, Hampshire (GB); Gordon D. Hutchison, Hampshire (GB); Matthew B. White, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 15/470,013

(22) Filed: Mar. 27, 2017

(65) Prior Publication Data

US 2018/0272622 A1 Sep. 27, 2018

(51) Int. Cl.
*B33Y 10/00* (2015.01)
*B29C 64/106* (2017.01)
*B29C 64/264* (2017.01)
*B29C 64/209* (2017.01)
*B33Y 30/00* (2015.01)
*B33Y 40/00* (2020.01)

(52) U.S. Cl.
CPC ............ *B33Y 40/00* (2014.12); *B29C 64/106* (2017.08); *B29C 64/209* (2017.08); *B29C 64/264* (2017.08); *B33Y 10/00* (2014.12); *B33Y 30/00* (2014.12); *B29K 2995/002* (2013.01)

(58) Field of Classification Search
CPC ......... B33Y 40/00; B33Y 10/00; B33Y 30/00; B33Y 70/00; B29C 64/264; B29C 64/209; B29C 64/106; B29C 64/118
See application file for complete search history.

(56) References Cited

U.S. PATENT DOCUMENTS

| | | | |
|---|---|---|---|
| 9,283,714 B2 | 3/2016 | Pridoehl et al. | |
| 2014/0134334 A1 | 5/2014 | Pridoehl et al. | |
| 2015/0142159 A1 | 5/2015 | Chang | |
| 2015/0321425 A1 | 11/2015 | Stava | |
| 2015/0375451 A1 | 12/2015 | Voris et al. | |
| 2016/0375638 A1* | 12/2016 | Kabili | B33Y 10/00 264/492 |

OTHER PUBLICATIONS

FDM Full-Color 3D Printer, Date: Jan. 5, 2015, Retrieved from Internet: URL: http://3dprinting-blog.com/tag/fdm-full-color-3d-printer/, 2 pages (3/5 and 4/5).
Spectrum—leading the Color revolution in 3D Printing, We are the color 3D printing pioneers, Jan. 24, 2017, Retrieved from Internet: http://spectrom3d.com/, 1 page.

* cited by examiner

*Primary Examiner* — Michael P Wieczorek
(74) *Attorney, Agent, or Firm* — Schmeiser, Olsen & Watts, LLP; William Hartwell

(57) ABSTRACT

A method and apparatus are provided for printing multicolored three-dimensional objects. The method includes: selectively exposing a photosensitive thermoplastic feedstock to light within an extrusion nozzle, the feedstock comprising a thermoplastic base mixed with a photosensitive material; extruding the exposed feedstock into a deposit to print an object; and photo-chemically developing the deposit to provide color to the deposit. An apparatus is provided for three-dimensional printing with an extrusion nozzle including a light exposing component for selectively exposing the photosensitive thermoplastic feedstock to light within the extrusion nozzle.

11 Claims, 4 Drawing Sheets

PRINTING MULTICOLORED THREE-DIMENSIONAL PRODUCTS

TECHNICAL FIELD

The present invention relates to printing multicolored three-dimensional products, and more specifically, to multicolored Fused Deposition Modeling using photosensitive plastic feedstock.

BACKGROUND

Fused Deposition Modeling (FDM) (Fused Deposition Modeling and FDM are trademarks of Stratasys Inc.) is a manufacturing technology for three-dimensional printing by laying down material in layers in the form of a plastic filament from a nozzle ejecting molten material. This three-dimensional printing technique is also referred to as Fused Filament Fabrication (FFF) or Plastic Jet Printing (PJP).

SUMMARY

An apparatus and method of printing multicolored three-dimensional objects is provided. The method includes selectively exposing a photosensitive thermoplastic feedstock to light within an extrusion nozzle, the photosensitive thermoplastic feedstock comprising a thermoplastic base mixed with a photosensitive material, extruding the exposed feedstock into a deposit to print an object, and photo-chemically developing the deposit to provide color to the deposit.

DETAILED DESCRIPTION

Figure 1:
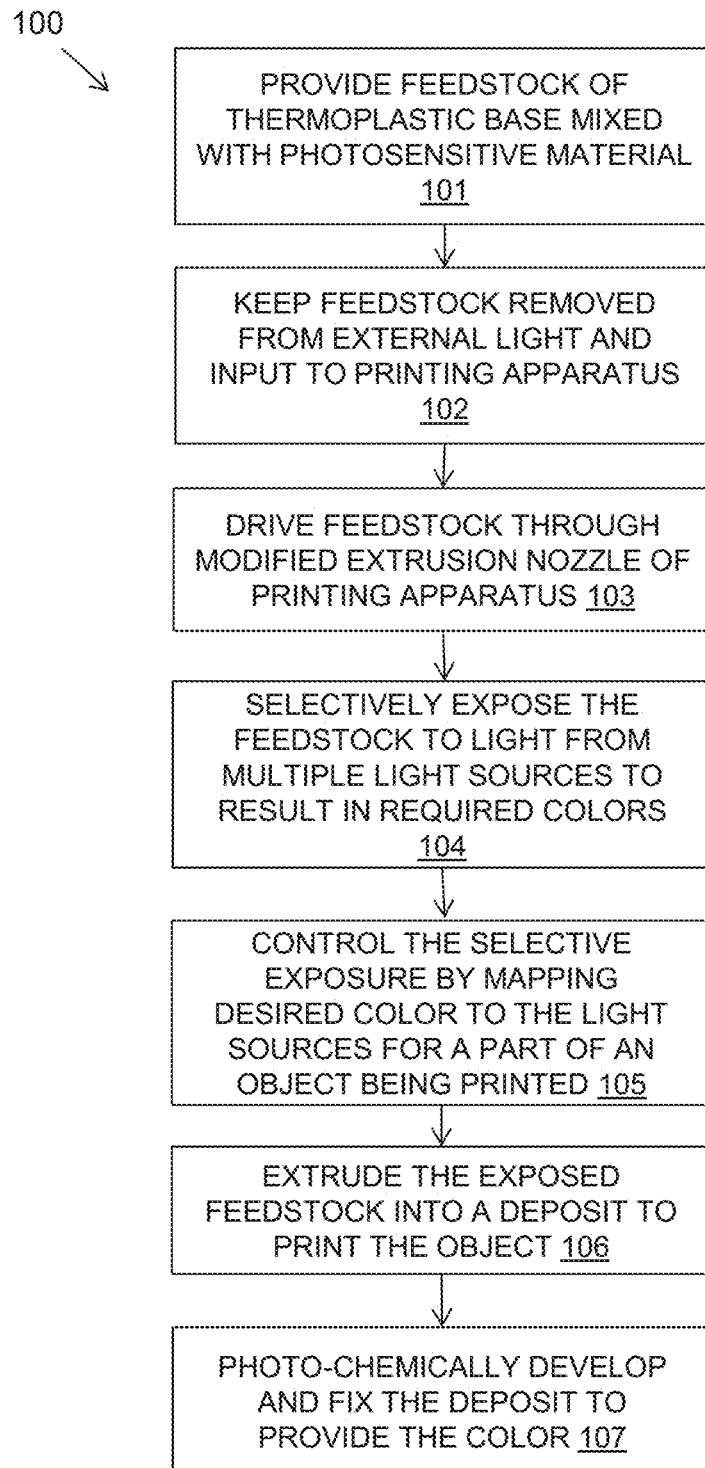
FIG. 1 is a flow diagram of an example embodiment of a method of printing multicolored three-dimensional objects, in accordance with embodiments of the present invention.

The FFF and PJP types of three-dimensional printers have limited color-printing capabilities. Multi-material printing is known through different nozzles through which different colors of feedstock material may be used, which is restricted to a number of fixed colors equal to the number of materials the printer can take in. Multi-material mixing through one nozzle is known in which machines produce a mixture of different colors of material. Thorough mixing is difficult to achieve due to the difficulties of sufficiently mixing the filament while keeping the melt zone as short as possible for good extrusion response. Mixing of colorant with the extruded material is another known technique and these machines suffer similar mixing issues as with multi-material mixing.

According to an aspect of the present invention there is provided a method of printing multicolored three-dimensional objects, the method comprising: selectively exposing a photosensitive thermoplastic feedstock to light within an extrusion nozzle, the feedstock comprising a thermoplastic base mixed with a photosensitive material; extruding the exposed feedstock into a deposit to print an object; and photo-chemically developing the deposit to provide color to the deposit.

According to another aspect of the present invention there is provided an apparatus for printing multicolored three-dimensional objects using an extruded feedstock to print an object, comprising: a feedstock input component for receiving a feedstock comprising a thermoplastic base mixed with a photosensitive material which is kept removed from exposed to light; an extrusion nozzle for extruding the exposed feedstock into a deposit to print the object and a light exposing component for selectively exposing the photosensitive thermoplastic feedstock to light within the extrusion nozzle; and a developing component for photo-chemically developing the deposit to provide color to the deposit.

According to a further aspect of the present invention there is provided a computer-implemented method for controlling printing multicolored three-dimensional objects, comprising: controlling an exposure of the photosensitive thermoplastic feedstock to light within an extrusion nozzle by a plurality of light sources of different colors in a required proportional intensity for a required resultant color; and controlling the color by mapping a desired color to the light source exposure of the plurality of light sources for a required portion of the deposit.

The described process and apparatus provide a photosensitive thermoplastic feedstock to a modified three-dimensional (3D) printing apparatus, which is extruded through a modified nozzle where it is exposed to colored light, possibly internally to the nozzle. The printed deposit or part is photo-chemically developed to result in a high resolution full color part using a process similar to that used in photography.

The modified printing apparatus uses FDM technology and conventionally begins with a software process that processes a digital three-dimensional model, mathematically slicing and orienting the model for the build process. If required, support structures may be generated.

The apparatus may dispense multiple materials to achieve different goals. For example, a first material may be used to build up the model and another material used as a soluble support structure.

The deposit or printed part is produced by extruding small, flattened strings of molten material to form layers as the material hardens after extrusion from the nozzle. The feedstock may be a plastic filament that is unwound from a coil or provided as granulated particles and supplied to an extrusion nozzle that can turn the flow on and off. A drive mechanism pushes the feedstock into the nozzle at a controlled rate.

Thermoplastic materials used as feedstock are heated by the nozzle to melt the material past their glass transition temperature and the molten material is then deposited by an extrusion head.

The nozzle can be moved in both horizontal and vertical directions by a numerically controlled mechanism. The nozzle follows a tool-path controlled by a computer-aided manufacturing (CAM) software package, and the part is generally built from the bottom up, one layer at a time. Stepper motors or servomotors are typically employed to move the extrusion head. The mechanism used is often an X-Y-Z rectilinear design, although other mechanical designs such as delta robot may be employed.

Various feedstock materials are available with different trade-offs between strength and temperature properties, such as Acrylonitrile Butadiene Styrene (ABS), Polylactic acid (PLA), Polycarbonate (PC), Polyamide (PA), Polystyrene (PS), lignin, rubber, among many others.

During FDM process, the hot molten polymer is exposed to air. Operating the FDM process within an inert gas atmosphere such as nitrogen or argon can significantly increase the layer adhesion and leads to improved mechanical properties of the 3D printed objects.

The described process and apparatus provide a photosensitive thermoplastic feedstock to a modified FDM apparatus. The FDM apparatus is modified to include a nozzle that provides selective light exposure to the feedstock as it is extruded, thereby activating the photosensitive material in the feedstock. The printed deposit is then photo-chemically developed to result in a high resolution full color printed part.

Photo-reagent chemicals may be included in the feedstock itself, which may be, for example, a thermoplastic filament or granulated particles.

A feedstock may use a regular thermoplastic base, for example, Poly Lactic-Acid (PLA), Acrylonitrile Butadiene Styrene (ABS), or Nylon mixed with a photosensitive material. Photosensitive materials may include, for example, silver halides emulsions including dye couplers that in combination with processing chemistry, form visible dyes. When color developer reduces exposed silver halide crystals, the developer is oxidized and the oxidized molecules react with the dye coupler molecules to form dye in the material. The feedstock may include approximately 1% to 10% by mass of a colorant formed of silver halide emulsion including dye couplers. Off-the-shelf silver halide emulsions may be used as provided by various manufacturers.

A neutral color existing thermoplastic feedstock such as Poly Lactic-Acid (PLA) filament or particle feedstock may be produced in dark-room conditions or a dark enclosed adaptation of existing processes.

In one specific example embodiment, the PLA feedstock may include 1% to 10% by mass of a colorant formed of silver halide emulsion including dye couplers (10 parts), ammonium thiosulphate (8 parts), and ferric ammonium EDTA (1 part). This embodiment is based on the Kodak RA-4 process (Kodak and RA-4 are trademarks of Eastman Kodak Company). Other formulations of the described colorant can be used with other colorant processes.

The thermoplastic feedstock contains silver halide emulsions sensitive to different wavelengths of light, usually three wavelengths, for example: cyan, magenta, and yellow. Cyan-colored dye is formed on the red-sensitive layer, magenta-colored dye is formed on the green-sensitive layer, and yellow-colored dye is formed on the blue-sensitive layer, following generally the CMY color model. There is already a very mature, sophisticated and industrial body of chemistry for this photo-chemical process, for example, chromogenic color print film developing processes such as C-41, K-16 and E-6, and the materials science of robustly embedding the dye into a film substrate used for, for example, 35 mm film.

Once produced, the color-feedstock may be contained in an opaque vessel to facilitate transportation outside of dark-room conditions or the enclosed manufacturing equipment. Such a feedstock would be kept in complete darkness, like a camera film, which may be achieved by using a filament cartridge system that is plugged into the extruder of the apparatus. For instance, a roll of filament in a box with an aperture perforated at the point of use to allow the filament to be extracted into the 3D printer.

The apparatus nozzle is adapted such as the channeled feedstock passes a plurality light sources such as electronically lit windows in direct contact with the channeled feedstock before the feedstock leaves the nozzle as extrudate.

In an embodiment in which the feedstock is a filament, the light sources may be applied to a strand of the filament before, during or after the heating process. The filament may be stretched to a thinner diameter during the heating process, enabling deeper distribution of the light sources within the filament.

In an embodiment in which the feedstock is of granulated form, the light sources may be applied during or after the melting process whilst the feedstock is within a channel or tube such as the extruding nozzle.

Multiple windows may be provided with one window for each color of light, for example, three windows for cyan, magenta and yellow light sources.

If desired, the ports of entry for the light into the feedstock nozzle may be replicated around the circumference of the feedstock tube to provide an even exposure of the 'external' surface of the feedstock to the light, which may be achieved by multiple windows for each color being distributed in a repeating pattern around the nozzle.

The light may be applied to the feedstock at right angles to the feedstock tube's axis to decrease the width of the exposing effect and thus increase the resolution.

The colors of lights used to expose the feedstock may depend on the photosensitive material used. The colors of lights are not necessarily the natural colors and may be the color negative of the desired result.

The color intensities may be set so as to expose the passing feedstock appropriately to form the desired color for the position that the extruded feedstock will be laid onto the deposit, which requires a mapping of desired color to exposure color. The color of light the feedstock is exposed to is a negative in the described process, with cyan set as a lower intensity as the feedstock is more sensitive. So there is a mapping of desired colour/brightness on one side, and exposure colour/brightness on the other. Other quantities and colors of lights may be used with bias of intensity varied to achieve desired results.

The light sources may be any selected multiple wavelengths of light, or any other means, that activate separately, three 3-colour pigments such as red-green-blue or cyan-magenta-yellow to different degrees that can then be developed later to give the impression of true color (i.e. any tone from a possible range on the spectrum in the plastic).

The feedstock may need to be exposed for the color of the part of the model due to be printed in a short time. The part of the model that the exposed extruded feedstock will form is predictable due to the known volume of the hot end and known volume of the "tracks" to be printed.

A cost improvement may be gained by using the already known technique of using a dual nozzle printer to print different parts of the object with different feedstock, for example, only using a photosensitive feedstock for the outer layer or layers.

As the extruded feedstock is very thin at the hot end of the extruder and slightly translucent, the light illuminates the extruded feedstock externally and internally with good coverage to expose the extruded feedstock fully, eliminating the need for post exposure mixing. As a very small amount of light is used and as the light travels a very small distance within a small tube, the feedstock does not need to be transparent, only translucent to allow the light exposure to occur at the correct levels. A level of opaqueness when solid may be desirable to prevent the light passing within the extruded feedstock like a fiber-optic cable.

The small diameter of the extruded feedstock that is being exposed minimizes the distance the light has to travel to reach the center of the extruded feedstock. The distance is shorter than that appropriate for the translucency of the material to allow the feedstock to be saturated with light of the correct relative weightings more or less evenly in cross section.

Additionally, as the feedstock may be made to be more or less equally translucent to the three colors of light used, any small ramp in exposure towards the center of the extruded feedstock will both be in terms of color saturation rather than producing a different color. Also, feedstock material in the center of the extruded feedstock is not as likely to be on the external surface of the printed part and vice versa.

Using existing photosensitive materials, a color space recognizable as "full-color" and with varying gradient can be achieved.

The 3D printer may otherwise be a standard Fused Deposition Modeling (FDM) type printer in dark-room conditions or fully surrounded with an opaque enclosure. Once the color-feedstock is loaded into the printer, a print shall be formed using the standard process constructing either all of the part, or just the outer shell of the part from the color-feedstock, in the latter case the rest of the part may be formed of standard feedstock using an existing multi-extrusion method.

The sensitive but 'unfixed' portion of the printed part is either printed in darkness or illuminated with the equivalent of a darkroom style 'red' light that does not affect the material. Once complete, the printed part may be kept in dark-room conditions or inside the enclosure of the machine.

The developer causes the outer shell of the printed part to develop the desired color that can then be set. The fix stage of traditional photographic development is required to stop further development of the color.

Some developers can be removed by simply washing with a solvent, such as water, to remove the development chemical, others may require a specific chemical to neutralize the development reaction (e.g. often these are alkali/basic). Delivery by washing may be achieved as some of the filaments for 3D printing are porous. Immersion or spraying with the fix could be used. Alternatively, if the fix's chemical properties permitted delivery may be in a gaseous form.

In one embodiment, the part may be moved to a bath where the part can be rinsed under or submerged in a developer formed of water (750 parts), triethanolamine (6 parts), sodium sulfite (1 part), color developer formula 3 (CD-3)(5 parts), potassium carbonate (40 parts) and sodium chloride (½ a part). The printed part may be developed for approximately 1 minute then rinsed with clean water until free from developer. Other chemical developers, different formulae and processing times may be used.

The printed part may then be rinsed in dilute acetic acid (1%) to fix the color, and then clean water to wash off the acetic acid fixer. Other fixing agents or other existing processes may be used.

The printed part may be removed from the apparatus's enclosure as dark-room conditions are no longer required. Once dry, the printing process is complete.

In another embodiment, the feedstock may have embedded within the feedstock micro-capsules containing the fix, which may enable the feedstock to be non-porous as feedstock will not need to be washed to fix the color. The feedstock micro-particles ordinarily would be dormant through most of the processes and may be activated or released when needed. Two methods for approaching this would be to have a heat ramp or second heating element to melt the micro-capsules that would need a higher melt point or to use targeted ultrasound to break these open.

Referring now to the drawings, FIG. 1 is a flow diagram of an example embodiment of a method of printing multi-colored three-dimensional objects, in accordance with embodiments of the present invention. Flow diagram 100 shows an example embodiment of the described process.

Feedstock is provided at step 101 in the form of a thermoplastic base mixed with photosensitive material. The photosensitive material may include a silver halides emulsion with dye couplers and dye developer. The photosensitive material when exposed to differing amounts of colored light combinations forms visible dyes to the thermoplastic base.

The feedstock is kept removed at step 102 from external light and input to the printing apparatus. The printing apparatus is a FDM apparatus with an extrusion nozzle through which the feedstock is driven at step 103.

The extrusion nozzle is modified to include multiple light sources and the feedstock is selectively exposed at step 104 to light from the multiple light sources to result in the required colors to be applied to the extruded feedstock. The process may control the selective exposure by mapping a desired color to the light sources for a part of an object being printed, at step 105.

The light exposure at step 104 may be during or at the end of the extrusion of the feedstock and the light exposed feedstock may be extruded at step 106 into a deposit to print the object. The object may be photo-chemically developed and fixed 107 to finalize and fix the color.

Figure 2:
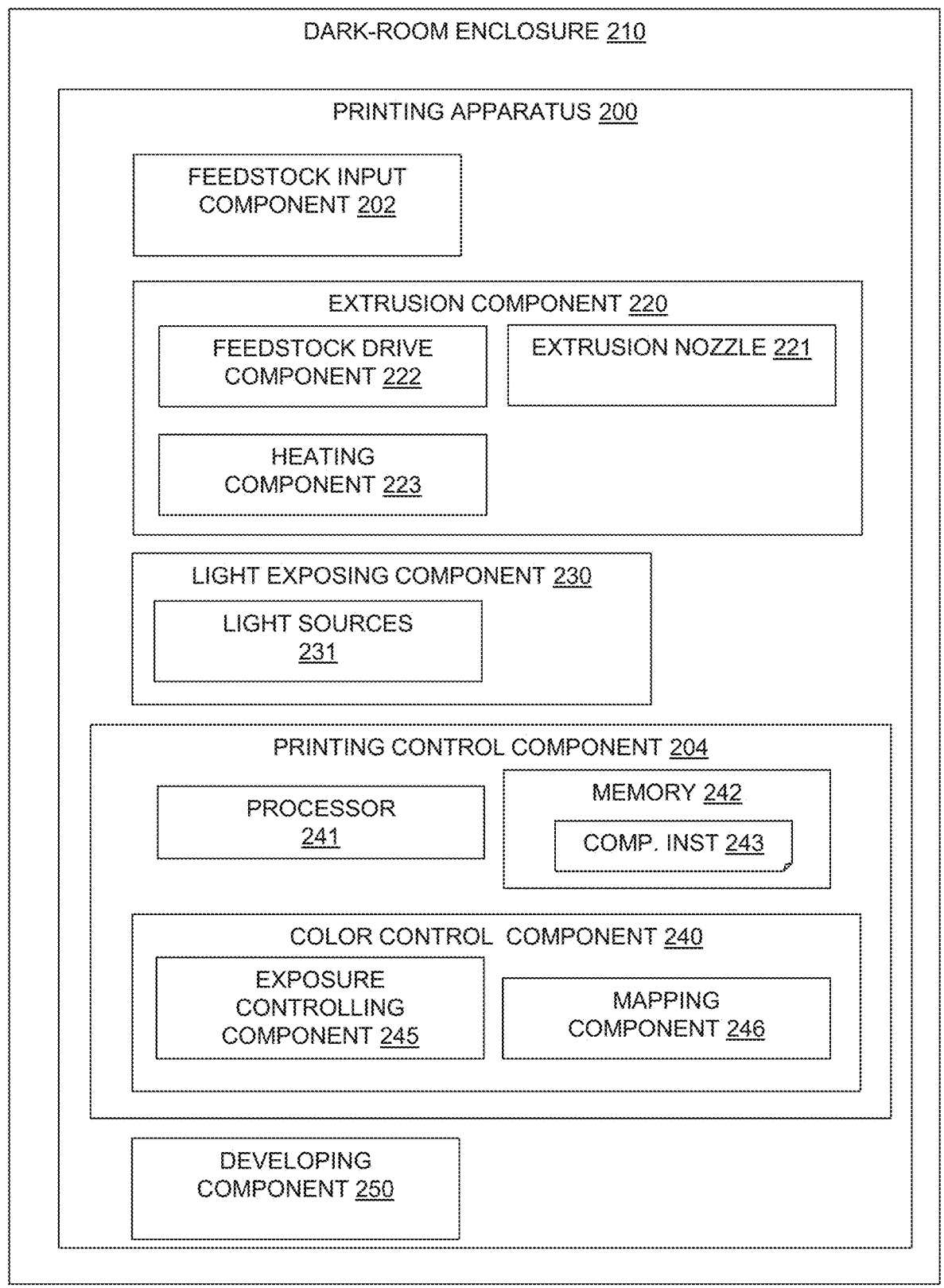
FIG. 2 is a block diagram of an example embodiment of a printing apparatus, in accordance with embodiments of the present invention.

Referring to FIG. 2, a block diagram shows an example embodiment of the printing apparatus 200, in accordance with embodiments of the present invention. A printing apparatus 200 in the form of a FDM apparatus is provided and operated in a dark-room enclosure 210 or under dark-room conditions.

The printing apparatus 200 may include a printing control component 204 that may be run on a computer system such that a controlling computer program can operate the printing apparatus. The printing control component 204 may include at least one processor 241, a hardware module, or a circuit for executing the functions of the described components which may be software units executing on the at least one processor. Memory 242 may be configured to provide computer instructions 243 to the at least one processor 241 to carry out the functionality of the printing control.

The printing apparatus 200 may include a feedstock input component 202 which may be in the form of a cartridge that may be plugged into an extrusion component 220 of the printing apparatus 200. The extrusion component 220 may include a feedstock drive component 222 for driving the feedstock to an extrusion nozzle 221 which may be heated by a heating component 223.

The extrusion component 220 may be provided in association with a light exposing component 230 for providing light through the sides of the extrusion nozzle 221, for example, by means of light sources 231 adjacent windows in the extrusion nozzle 221.

A color control component 240 may be provided which may be incorporated into the printing control component 204 that controls the movement of the extrusion nozzle 221. The color control component 240 may include an exposure controlling component 245 for controlling the intensity and duration of the light sources 231 under control of a mapping component 246 which maps a desired color to a part being printed.

The printing apparatus 200 may include a developing component 250 for developing the color of the photosensitive material in the extruded feedstock and fixing the color, which may be a bath or a series of baths of the developing and fixing chemicals in liquid form into which the extruded object may be placed. Alternatively, this may be a spray compartment for delivering the developing and fixing chemicals in gaseous form.

Figure 3:
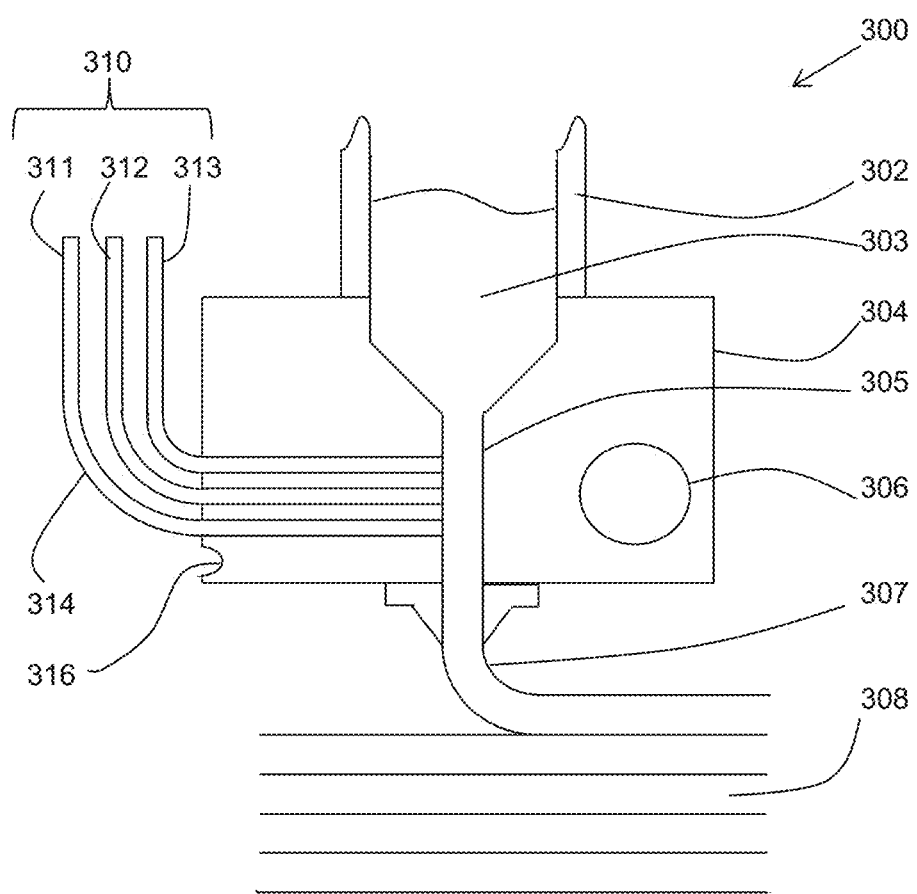
FIG. 3 is a cross section view of a printing apparatus, in accordance with embodiments of the present invention.

FIG. 3 depicts a schematic cross-section 300 of a portion of the printing apparatus, in accordance with embodiments of the present invention. The portion of the printing apparatus shows the extrusion component that has a hot end 304 with a heat break 302 surrounding an input funnel 303 to the extrusion nozzle 305. A heating element 306 applies heat to the extrusion nozzle 305 and a thermistor may be provided in a recess 316 to measure the nozzle temperature for the heating control loop.

The hot end 304 receives the feedstock, for example, as a filament, from the extruder via the heat break 302. In an exemplary embodiment, the heat break 302 may have a diameter of approximately 1.75 to 3.00 mm. The heating element 306 melts the filament, which progresses down the narrower section in the form of the extrusion nozzle 305 of the hot end. The extrusion nozzle 305 may have a diameter of approximately 0.1 to 0.6 mm.

Light sources of several colors 310, for example light emitting diodes (LEDs), illuminate the filament through glass light pipes 314 to expose the photosensitive material in the filament. The transparency of the filament is such that the light is able to penetrate the fraction of a millimeter diameter of the molten filament here, but such that excessive light cannot travel the few millimeters to the nozzle opening and the printed part 308.

The extruded feedstock 307 is laid in a controlled pattern to form a printed part 308 of an object, which is then processed by another portion of the apparatus to develop and fix the color.

The light sources 310 may have at least three colors 311, 312, 313. The light pipes 314 may supply the light to the extrusion nozzle 305 such that the light is emitted perpendicularly into the nozzle 305. The light pipes 314 may be arranged such that each color is delivered in a circumferential spacing around the nozzle 305.

Figure 4:
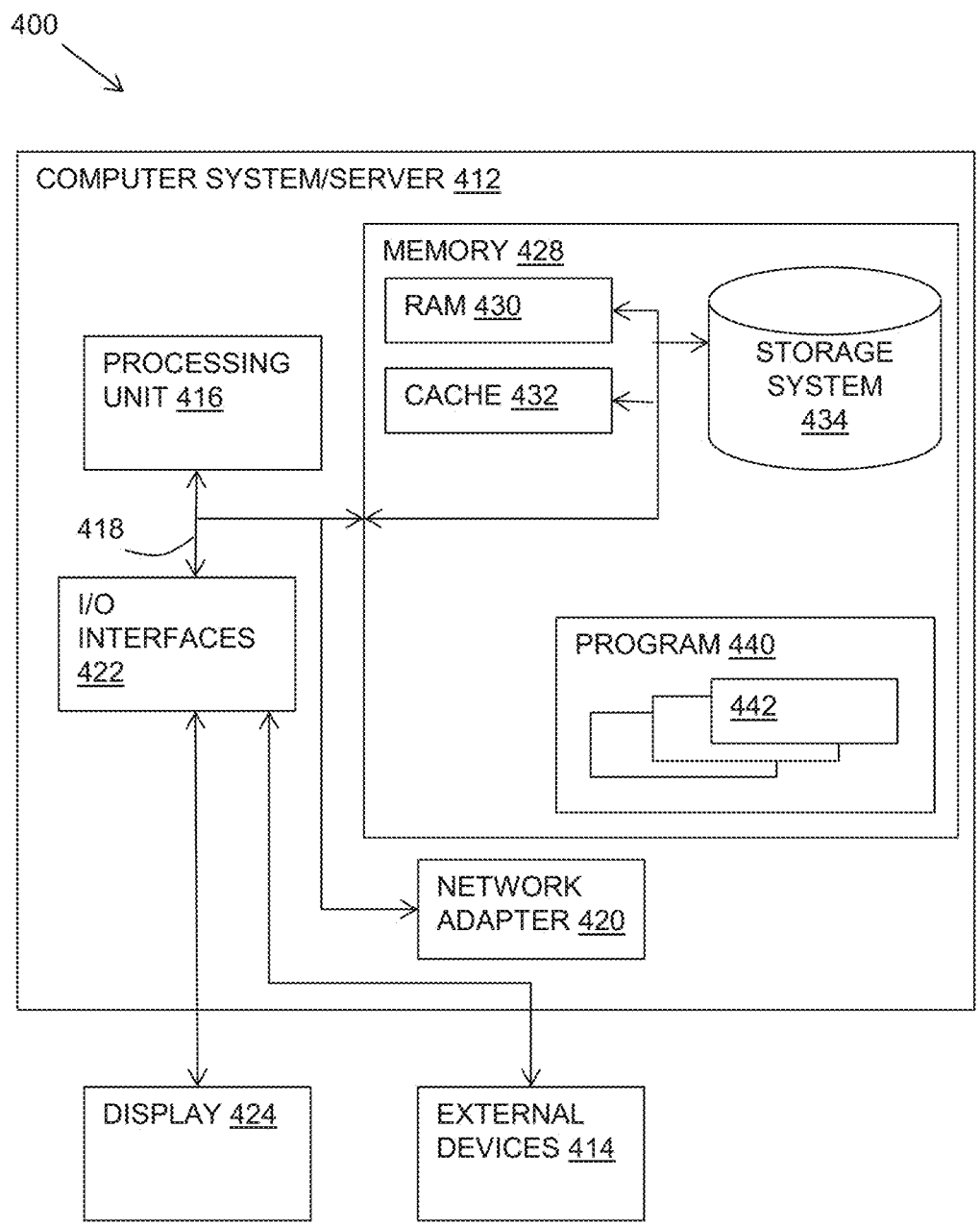
FIG. 4 depicts a block diagram of a computing system capable of implementing the printing of multicolored three-dimensional objects, in accordance with embodiments of the present invention.

FIG. 4 depicts a block diagram of a computing system capable of implementing the printing of multicolored three-dimensional objects, in accordance with embodiments of the present invention. A schematic of an example of a system 400 in the form of a computer system or server is shown which may be provided in communication with the described printing apparatus for control of the printing apparatus including the color control.

A computer system or server 412 may be operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

In FIG. 4, a computer system/server 412 is shown in the form of a general-purpose computing device. The components of the computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method of printing multicolored three-dimensional objects, the method comprising:
    selectively exposing a photosensitive thermoplastic feedstock to light within an extrusion nozzle, the photosensitive thermoplastic feedstock comprising a thermoplastic base mixed with a photosensitive material;
    extruding the exposed feedstock into a deposit to print an object; and
    photo-chemically developing the deposit to provide color to the deposit;
    wherein the photosensitive thermoplastic feedstock is kept removed from external light until the photosensitive thermoplastic has been photo-chemically developed.

2. The method as claimed in claim 1, wherein the photosensitive thermoplastic feedstock is a partially transparent, thermoplastic-based filament including silver halide emulsions including dye couplers.

3. The method as claimed in claim 1, wherein selectively exposing the photosensitive thermoplastic feedstock to light within the extrusion nozzle provides a plurality of light sources of different colors directly to the photosensitive thermoplastic feedstock in the nozzle in a required proportional intensity for a required resultant color.

4. The method as claimed in claim 3, wherein the plurality of light sources of different colors are applied substantially perpendicular to a direction of extrusion of the photosensitive thermoplastic feedstock and spaced circumferentially around the nozzle.

5. The method as claimed in claim 3, further comprising controlling the color by mapping a desired color to the light source exposure of the plurality of light sources for a required portion of the deposit.

6. The method as claimed in claim 5, wherein controlling the color includes providing the color to only an outer shell portion of the deposit.

7. The method as claimed in claim 3, wherein selectively exposing the photosensitive thermoplastic feedstock to light exposes the photosensitive thermoplastic feedstock to a negative color of the light, with cyan set as a lower intensity as the photosensitive thermoplastic is more sensitive.

8. The method as claimed in claim 1, wherein photo-chemically developing the deposit to provide color to the deposit includes applying a fluid including a chemical developer and rinsing or stopping the application after a predetermined time.

9. The method as claimed in claim 8, wherein applying a fluid is carried out by submersing the deposit in a bath of liquid chemical developer.

10. The method as claimed in claim 8, wherein applying a fluid is carried out by spraying the deposit with a gaseous chemical developer.

11. The method as claimed in claim 1, wherein photo-chemically developing the deposit to provide color to the deposit includes activating micro-particles of color fixative in the feedstock by applying additional heat or ultrasound.

* * * * *